United States Patent [19]
Sautter, Jr.

[11] Patent Number: 5,620,226
[45] Date of Patent: Apr. 15, 1997

[54] SIMPLIFIED AUTOMATED TOP OPERATOR

[75] Inventor: Robert H. Sautter, Jr., Jackson, Mich.

[73] Assignee: Dura Convertible Systems, Inc., Adrian, Mich.

[21] Appl. No.: 568,780

[22] Filed: Dec. 7, 1995

[51] Int. Cl.⁶ ..................................................... B60J 7/08
[52] U.S. Cl. ......................... 296/107; 296/117; 296/136
[58] Field of Search .......................... 296/107, 115–117, 296/120.1, 121, 122, 136

[56] References Cited

U.S. PATENT DOCUMENTS

| | | | |
|---|---|---|---|
| 2,895,764 | 7/1959 | Himka et al. | 296/117 |
| 5,042,868 | 8/1991 | Nothaft et al. | 296/107 |
| 5,067,768 | 11/1991 | Fischbach | 296/107 |
| 5,154,479 | 10/1992 | Sautter, Jr. | 296/121 |
| 5,279,119 | 1/1994 | Shelhart et al. | 60/401 |
| 5,284,378 | 2/1994 | Sautter, Jr. | 296/224 |

FOREIGN PATENT DOCUMENTS

| | | | |
|---|---|---|---|
| 0336088 | 10/1989 | European Pat. Off. | |
| 698789 | 11/1979 | U.S.S.R. | 296/136 |

*Primary Examiner*—Dennis H. Pedder
*Attorney, Agent, or Firm*—David A. Greenlee

[57] ABSTRACT

Apparatus for operating a five-bow convertible top includes two multi-purpose hydraulic cylinders which are connected by linkages to the rear rails to operate the top, to operate the rear bow, and to operate the tonneau. The cylinder rods are pivoted to a rear bow control link and to a power link. A gas spring biases the tonneau open, while an intermittent drive connected to the cylinder rods overcomes the biasing device to close the tonneau. During initial extension of the cylinder rods, the control link raises the rear bow; then the tonneau is unlatched and is raised by the intermittent drive. Simultaneously, the power link latches to and drives the rear rail to begin lowering the top. The tonneau then begins to close as the top is further lowered. The tonneau closes when the top is fully lowered. The cylinders are retracted to raise the top. Initially, the tonneau begins opening as the power link rotates the rear rail to begin raising the top. As the top is further raised, the intermittent drive begins to close the tonneau. When the rear rail is fully rotated, and the power link disengages from it, the tonneau is closed. Further retraction of the cylinder rods causes the control link to lower the rear bow onto the tonneau, where it is latched.

19 Claims, 10 Drawing Sheets

SIMPLIFIED AUTOMATED TOP OPERATOR

BACKGROUND OF THE INVENTION

This invention relates generally to automotive convertible tops and, more particularly, to a simplified operator for the top, rear bow and tonneau of a five-bow convertible top.

Five-bow convertible tops feature a movable rear, or fifth bow, which is initially raised upon movement of the convertible top from either raised or lowered position to the other position. This moves the bow out of the path of movement of the tonneau, which must be opened to enable the top to be lowered or raised. In top lowered position, the tonneau covers the stored top and in top raised position, the rear bow rests atop the tonneau.

In some convertibles, this rear bow movement is performed manually, as are the tonneau and top movements. In other convertibles, these operations are partially manual and partially powered. In yet other convertibles, all operations are powered. And in some of these all-power convertibles, operation is entirely automatic, performed by operating a single switch, the so-called "one-button top".

One current production all-power one-button top is produced by Mercedes-Benz and features three pairs of hydraulic cylinders which sequentially operate the tonneau, the rear bow and the top. This type of top installation is expensive, since six hydraulic cylinders and extensive plumbing is required for operation. Also, a manifold and extensive valving are required to sequence the movements of the system. Further, operation is slow, because each sequential operation must be completed before the next is begun.

Simplification of this top operating system is desirable. One simplified arrangement is disclosed in published European Patent Application 0 336 088, filed 18 FEB 89, which eliminates at least one pair of hydraulic cylinders. One pair of cylinders and mechanical linkages functions to sequentially move the rear bow and the top after the tonneau has been opened. The tonneau is moved separately, either manually in a semi-automatic embodiment, or by a second, separate pair of cylinders.

It would be desirable to provide an automatic convertible top which requires only a single pair of hydraulic cylinders to operate the top, the rear bow and the tonneau automatically.

It would also be desirable to provide an automatic convertible top which reduces top operation time by using a mechanical linkage to move the tonneau, rear bow and tonneau simultaneously.

SUMMARY OF THE INVENTION

It is therefore an object of this invention to provide an automatic convertible top which requires only a single pair of hydraulic cylinders to operate the top, the rear bow and the tonneau automatically.

Another object of this invention is to provide an automatic convertible top which reduces top operation time by using a mechanical linkage to move the tonneau, rear bow and tonneau simultaneously.

In one aspect, this invention features a convertible vehicle having a foldable top which is movable between an extended raised position which covers a passenger compartment and folded lowered position in a storage well which opens the passenger compartment, and a tonneau that is movable between positions opening and closing the storage well. The top comprises spaced articulated side rail structures interconnected by spaced transverse bows, including a movable rear bow that engages the closed tonneau in top raised position, a power operator, and a linkage connecting the power operator to the side rail structures for raising and lowering the top. A second linkage connects the power operator to the tonneau to open the tonneau to enable top movement between raised and lowered positions and to close the tonneau in top raised and lowered positions. A third linkage connects the power operator with the rear bow to raise the rear bow during top raising to move the tonneau between open and closed positions. This arrangement enables the power operator to open the tonneau, raise the top and rear bow, close the tonneau and lower the rear bow to move the top from lowered to raised position. It also raises the rear bow, opens the tonneau, lowers the top, and closes the tonneau to move the top to lowered position.

In another aspect, this invention features second linkage means which include a biasing device which biases the tonneau open, and an intermittent drive connecting the tonneau to the power means which enables the tonneau to remain open during movement of the top between raised and lowered positions, and overcomes the biasing means to close the tonneau upon operation of the power means when the top reaches either raised or lowered position.

In yet another aspect, this invention features operating means which include an intermittent drive which delays tonneau movement until after the rear bow is raised or lowered, enables the tonneau to remain open during movement of the top between raised and lowered positions, and causes the tonneau to close as the top reaches either raised or lowered position.

In still another aspect, this invention features a rear rail pivotally mounted on the vehicle at a first pivot, and a hydraulic cylinder having an output rod that is extensible to lower the top and retractable to raise the top. A power link is pivotally mounted on the vehicle at the first pivot and pivoted to the output rod at a power pivot. The rear bow is pivoted to the rear rail at a second pivot, and a control link is mounted on the second pivot and pivoted to the rear bow at a third pivot. The rear rail includes an abutment drivingly engageable by the power link after extension of the output rod so that initial extension of the output rod causes the control link to raise the rear bow before the power link engages the abutment, and further extension of the output rod causes the power link to pivot the rear rail to lower the top.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
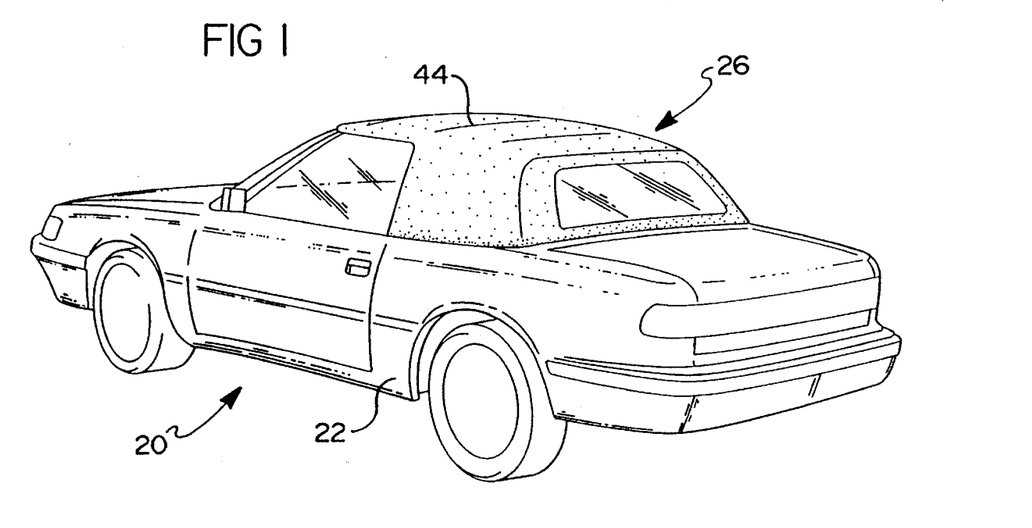
FIG. 1 is a perspective view of a convertible vehicle, illustrated with its top in extended raised position.
Figure 2:
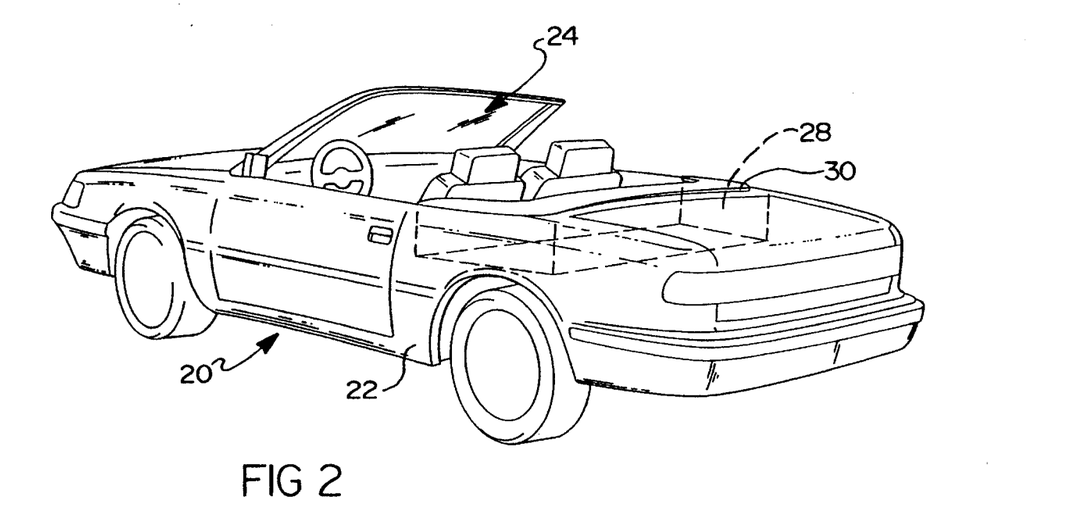
FIG. 2 is a view similar to FIG. 1, but with the top illustrated in folded lowered position covered by a tonneau.

Referring initially to FIGS. 1 and 2, a convertible vehicle 20 has a body 22 which houses a passenger compartment 24 that is closed and opened by a convertible top 26. Top 26 is movable from the raised position of FIG. 1 to the lowered and folded position of FIG. 2 where it is stored in a storage compartment 28 that is closed by a tonneau 30.

FIGS. 3 and 7–11 illustrate the sequence of movement of top 26 from its extended, raised FIG. 1 position to its folded, lowered FIG. 2 position. The following description of the component parts of top 26 references all of FIGS. 3 and 7–11, since some of them show the interrelationship of these parts better than others.

Figure 3:
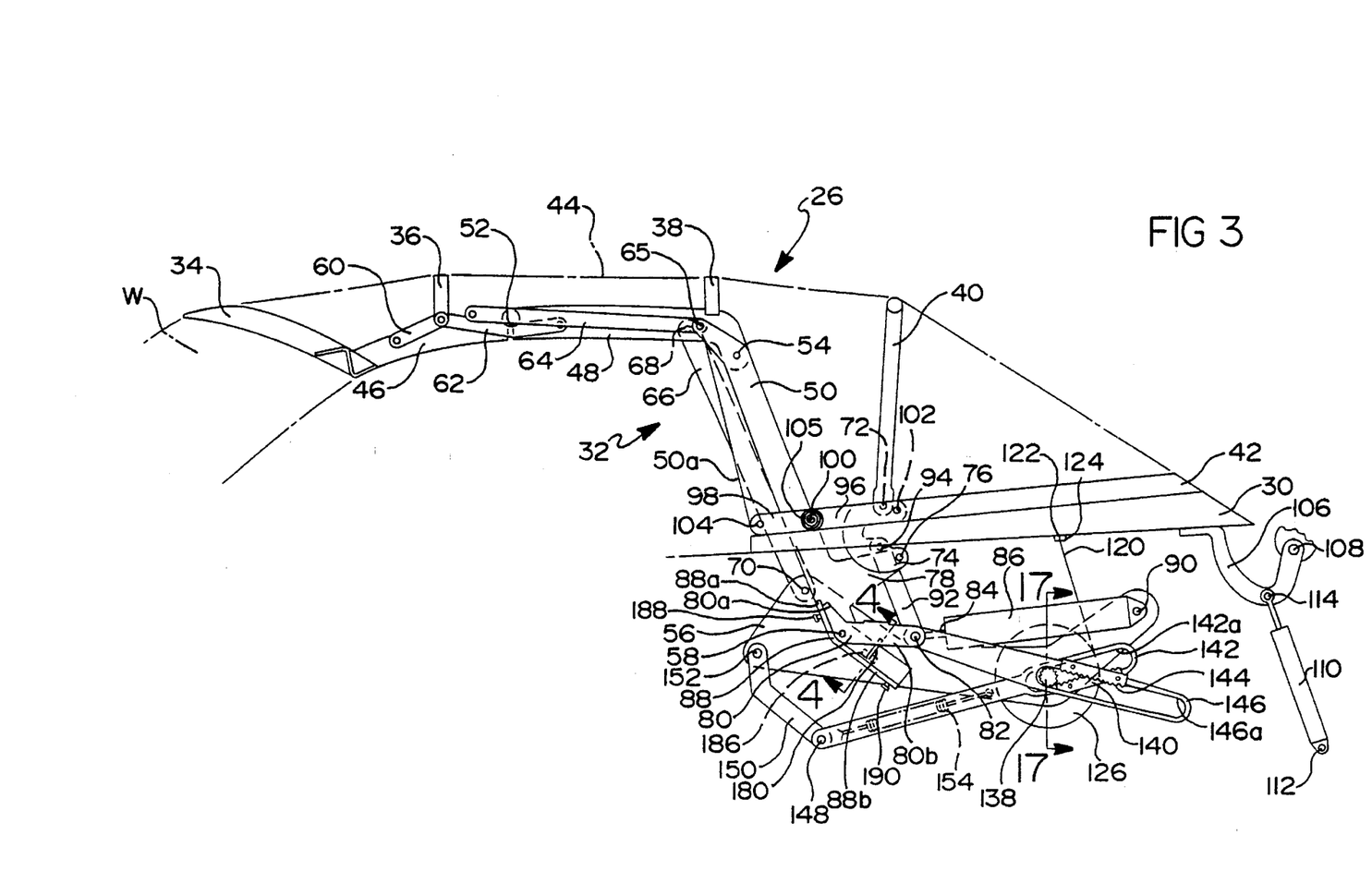
FIG. 3 is an enlarged side view of the top in extended raised position, here shown without its fabric cover and without vehicle structure to fully show the top structure and the operating mechanisms for the moving the top, tonneau and rear bow according to this invention.

Top 26 comprises a pair of substantially identical articulated side linkages 32 (only the left side illustrated) interconnected by a header or #1 bow 34, spaced intermediate #2, #3 and #4 bows denoted 36, 38, 40, and a rear or #5 bow 42, all covered by a fabric cover 44. Linkage 32 comprises a front rail 46, a center rail 48 and a rear rail 50. Front rail 46 is pivoted to center rail 48 at 52, while center rail 48 is pivoted to rear rail 50 at 54. Rear rail 50 is pivoted to a body bracket 56 at 58 and includes a filler panel forward extension 50a.

Bow links 60 and 62 pivotally connect bow 36 to front rail 46 and center rail 48. A control link 64 pivotally interconnects front rail 46 and rear rail 50 at 65. A balance link 66 is pivoted to center rail 48 at 68 and to body bracket 56 at 70. Bow 38 is rigidly attached to rear rail 50, while bow 40 is pivoted to rear bow 42 at 72. Rear bow 42 has a curved inner ear 74 that is pivoted at 76 to an arm 78 extending from the lower end of rear rail 50.

The following description relates to the operating mechanism on only one side of the vehicle. This mechanism is preferably duplicated on the other side of the vehicle to permit synchronized and balanced movement of the top and tonneau.

Figure 7:
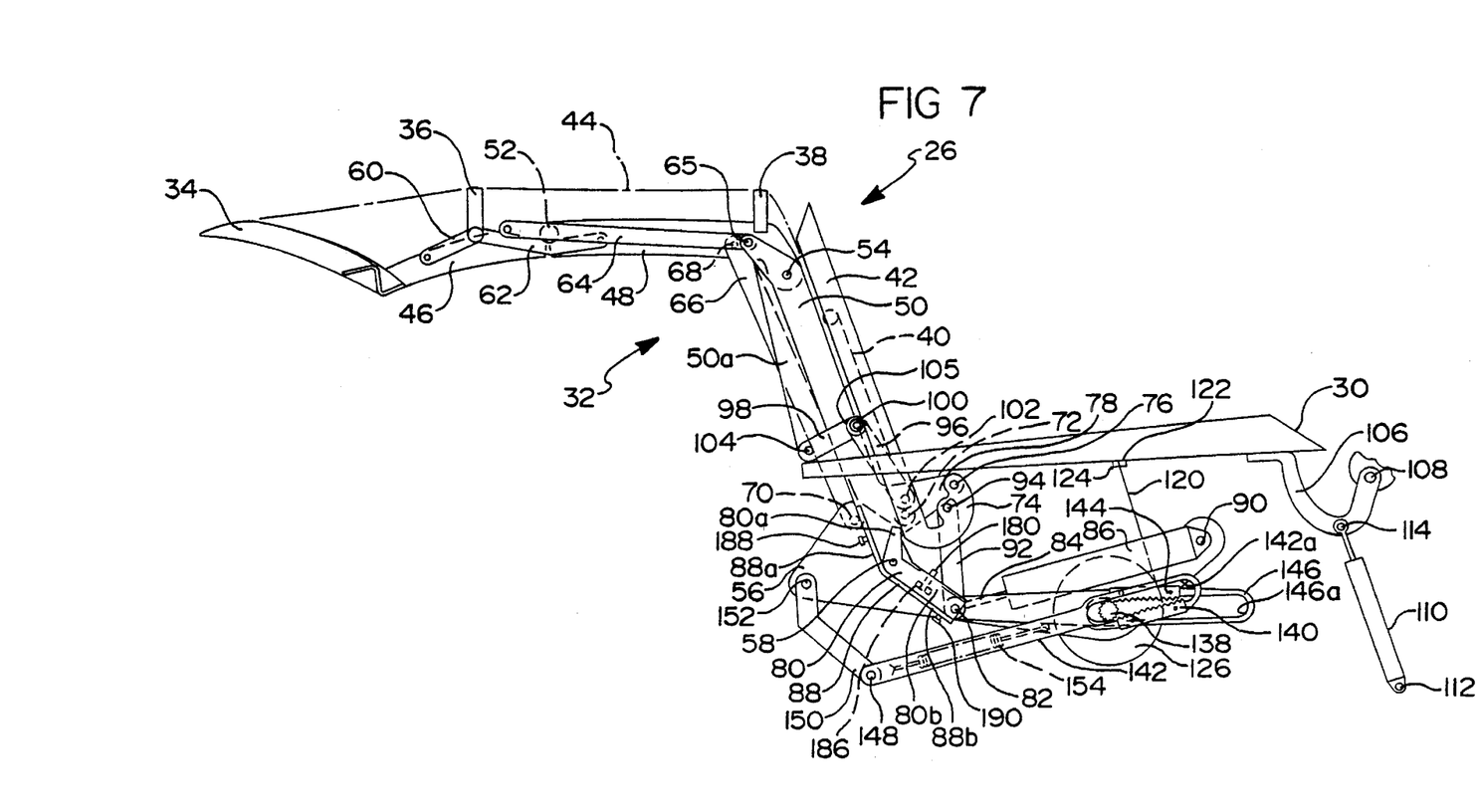
FIG. 7 is a view similar to FIG. 3, but showing the rear bow raised during initial lowering movement of the top.

A drive link 80 is pivoted at 58 on body bracket 56 and has an upper leg 80a and a lower leg 80b which has a movable power pivot 82 to the end of output rod 84 of a double-acting hydraulic cylinder 86. Drive link 80 is mounted for limited movement by cylinder 86 between the upper portion 88a of a rear rail abutment flange 88 and its lower portion 88b. Cylinder 86 is pivoted to body bracket 56 at 90. A #5 bow control link 92 is attached to power pivot 82 which it connects to a pivot 94 on rear bow inner ear 74. Intermediate and forward extension links 96 and 98 are pivotally interconnected at 100 and connect to #5 bow 42 at 102 and to rear rail extension 50a at 104. A spring 105 engages links 96 and 98 about pivot 100 and biases the links to fold downward of pivot 100, as shown in FIG. 7.

Hinges 106 (only one shown) mount the rear of tonneau 30 and are pivotally mounted on the vehicle body at 108. A gas spring 110, pivoted to the vehicle body at 112 and to hinge 106 at 114, biases tonneau 30 open. A flexible cord 120 is attached to tonneau 30 at 122 and extends through a body fitting 124 to a wind-up reel 126, shown in detail in FIG. 7. Reel 126 is mounted for rotation on a bushing 128 rotates on an axle 130 that extends between body mounting plates 132 and 134, which are part of body bracket 56. A clutch 136 connects reel 126 to a drive pinion 138 which is selectively engageable with the teeth of a rack 140 of a lower drive member 142 and the teeth of a rack of 144 of an upper drive member 146.

Rack 140 is located centrally on the lower side of an elongated slot 142a at one end of lower drive member 142 and is mounted for adjustment along the slot. Slot 142a provides space at either end where drive pinion 138 disengages rack 140. The other end of lower drive member 142 is pivotally connected at 148 to a drive member control link 150 which is pivotally mounted on body bracket 56 at 152. A tension spring 154 is attached to bracket 56 and biases lower drive member 142 rightward, as viewed in FIGS. 3 and 7–11.

Rack 144 is located near the inner end on the upper side of a slot 146a at one end of upper drive member 146 and is mounted for adjustment along the slot. Drive pinion 138 disengages rack 144 at either end of slot 146a. The inner end of upper drive member 146 is attached to the power pivot 82 carried by hydraulic cylinder output rod 84.

Clutch 136 is similar to a conventional window regulator drive clutch. A torsion spring 160 has inwardly turned ends 162 and 164 which engage a drive tab 166 that is secured to reel 126 by bushing 128, and engage drive tabs 168a and 168b that are secured to pinion 138 by bushing 169. Spring 160 normally expands into frictional engagement with the interior surface of a cup 170 that is secured to body bracket 56.

Any attempt to rotate reel 126 in either direction causes tab 166 to engage one of spring ends 162 or 164 which unwinds spring 160 tightly into frictional engagement with immovable cup 170, preventing rotation of reel 126. Rotation of pinion 138 by either lower member rack 140 or upper member rack 144 will engage tab 168a with spring end 164 or engage tab 168b with spring end 162. This winds up spring 160 so that it disengages cup 170 which enables pinion 138 to rotate and engage either tab 168a or tab 168b with tab 166 to rotate reel 126. Thus, reel 126 is immovable unless rotated by pinion 138.

Figure 5:
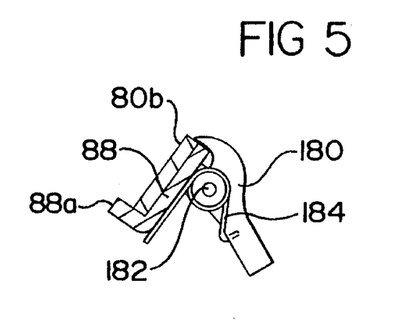
FIG. 5 is a view similar to FIG. 4, but with the latch shown latched.

As will be later described in detail, drive link 80 rotates about pivot 58 between the FIG. 3 position, with upper leg 80a engaging upper flange portion 88a, and the FIG. 7 position, with a lower leg 80b engaging lower flange portion 88b. As shown in FIG. 5, drive link 80 is latched into engagement with flange 88 (FIG. 7 position) by a latch member 180 that is pivotally mounted at 182 to lower flange portion 88b and biased by a spring 184. A tab 186, mounted on body bracket 56, engages latch member 180 to release drive link lower leg 80b when it is in the FIG. 3 position.

A threaded adjustment bolt 188 is provided in upper flange portion 88a to adjust the upper FIG. 3 position of drink link 80 and rear rail 50. Another threaded adjustment bolt 190 is provided in lower flange portion 88b to adjust the lower FIG. 7 position of drink link 80 and rear rail 50.

Figure 12:
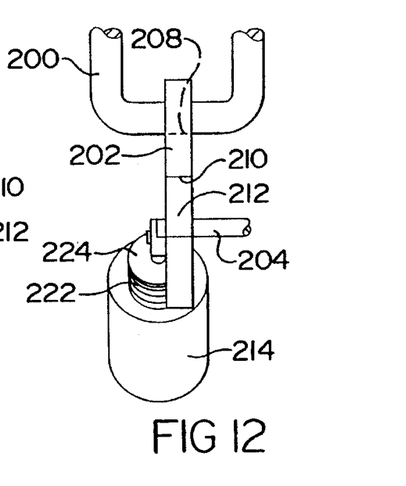
FIG. 12 is an enlarged detail end view of one form of top pulldown latch.
Figure 13:
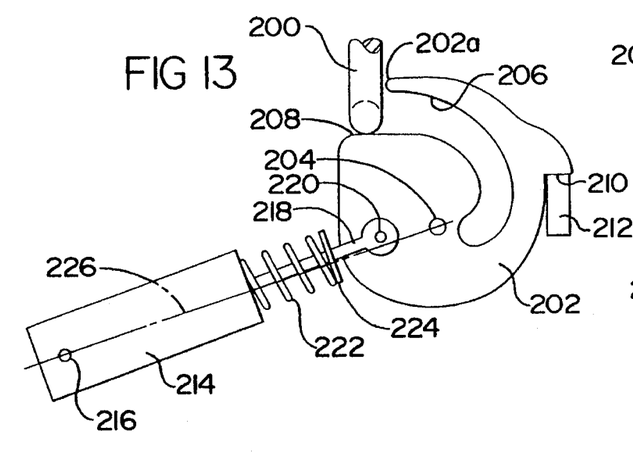
FIG. 13 is a side view of the latch of FIG. 12.

In the FIG. 3 raised position header 34 is preferably secured to the vehicle windshield W by a power latch system, such as disclosed in U.S. Pat. Nos. 5,284,378 and 5,154,479 to Sautter, Jr. Tonneau 30 is preferably secured to the vehicle body by a power latch system, such as illustrated in FIGS. 12 and 13. A U-shaped hook 200 may be attached to the bottom of each side of tonneau 30. A receiver 202 for each hook 200 is mounted to the vehicle body by a pivot pin 204 and includes a spiral latch groove 206, a hook abutment 208, and a stop shoulder 210 which engages a body stop 212 in the unlatched position of FIG. 13.

A solenoid 214 is pivotally mounted on the vehicle body at 216 and includes an output arm 218 that is pivoted to receiver 202 at 220. A compression spring 222 surrounds rod output 218 and is confined between the body of solenoid 214 and a retainer 224 mounted on output rod 218. In the release position of FIG. 13, pivot 220 lies above a line 226 extending between pivots 216 and 220 to bias shoulder 210 into engagement with stop 212. This is a spring-latch, solenoid-unlatch arrangement.

When tonneau 30 is lowered to its closed position, hook 200 engages and depresses abutment 208, rotating receiver 202 to move pivot over center across line 226. Spring 222 then extends to further rotate receiver 202 (counterclockwise in FIG. 13) and capture hook 200 in spiral groove 206. Rotation of receiver 202 pulls down hook 200 and latch tonneau 30 closed.

When it is desired to open tonneau 30, solenoid 214 is actuated to retract output rod 218 to rotate retainer in the reverse direction (clockwise in FIG. 13) until pivot 220 lies on line 226, nearly releasing hook 200. As hook 200 is forced up when tonneau 30 is driven open, as later detailed, it impacts receiver tip 202a sufficiently to slightly rotate receiver 202 to force pivot 220 back over center. Spring 222 biases abutment 210 into engagement with stop 212 as solenoid 214 is deenergized.

Figure 14:
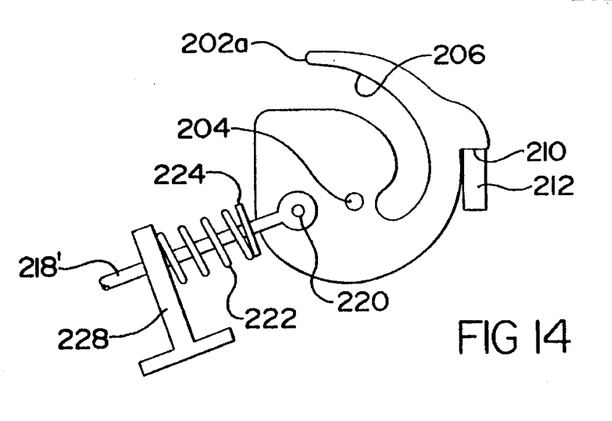
FIG. 14 is an enlarged detail side view of another form of top pulldown latch.
Figure 15:
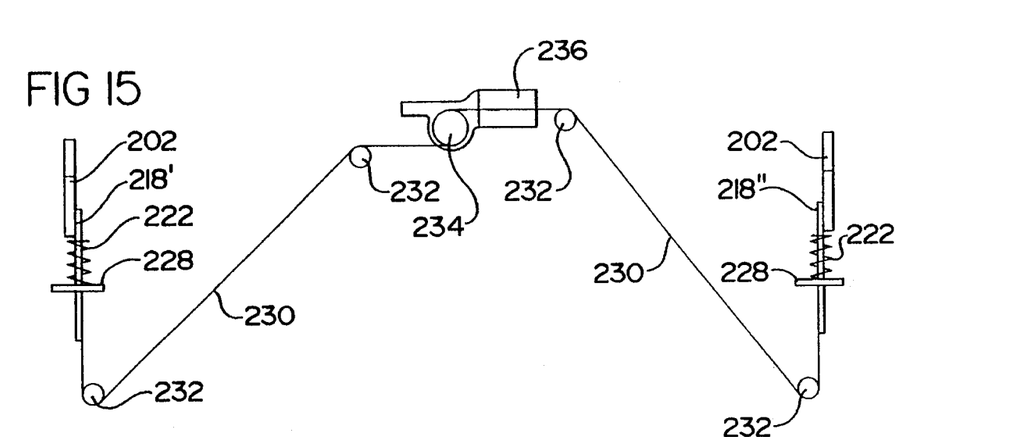
FIG. 15 is a plan view of the operating mechanism for the pulldown latch of FIG. 14.
Figure 16:
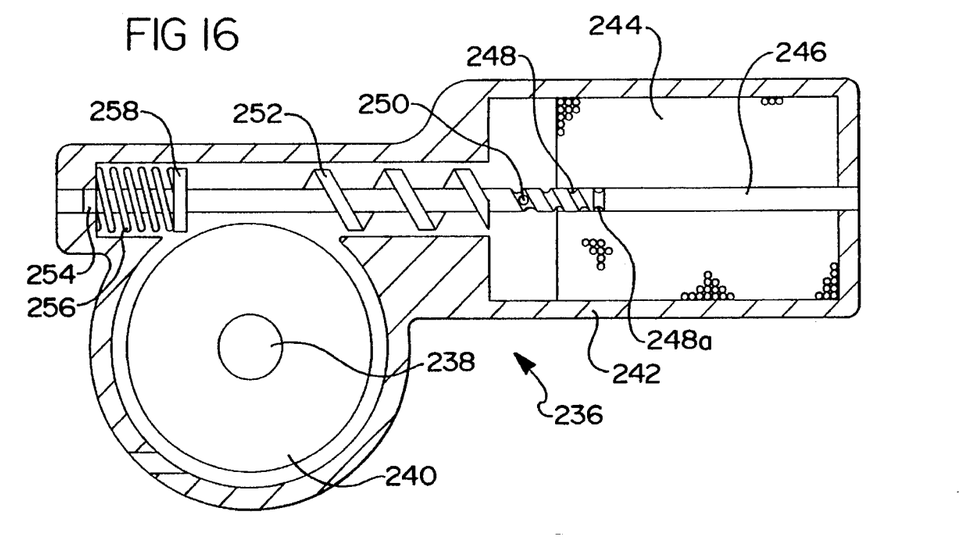
FIG. 16 is an enlarged sectional view of the motor and gearbox of the operating mechanism of FIG. 15.

An alternative form of latch mechanism is shown in FIGS. 14–16. Here each spring 222 surrounds rod 218' and is confined between retainer 224 and a body-mounted bracket 228. Rods 218' are attached to cables 230 that are entrained over body-mounted pulleys 232 and are operatively attached to reel 234 that is driven by a power unit 236 that performs the same function as solenoid 214.

Power unit 236 is shown in FIG. 16. Reel 234 is mounted on a shaft 238 that mounts a worm gear 240 located within power unit housing 242. An electric motor 244 is located in housing 242 and is operable to drive an output shaft 246 that has a spiral groove 248 that confines a pin 250 mounted in housing 242. Shaft 246 mounts a worm 252 and has its distal end 254 slidingly journaled in housing 242. A compression spring 256 is confined between the housing and a retainer ring 258 and biases worm 252 out of engagement with worm gear 240.

Actuation of motor 24 rotates shaft 246 which is moved axially against spring 258 by movement of spiral groove 248 past pin 250. Shaft axial movement continues, engaging worm 252 with worm gear 240, until pin 250 reaches the circumferential terminus 248a of groove 248. Motor 24 will continue to drive worm gear 240, shaft 238 and reel 234, winding or unwinding cables 230 to operate latch receiver 202, as previously described.

If desired, latch systems similar to those detailed in FIGS. 12 and 13 or in FIGS. 14–16 may be provided to clamp rear bow 42 to tonneau 30. The latch receivers could be carried by tonneau 30 to latch rear bow 42 directly to tonneau 30. The latch system of FIGS. 12 and 13 would be suitable for this arrangement. Alternatively, the latch receivers 202 could be body mounted and engage latch hooks 200 through holes in the tonneau, as was done in the Cadillac Allante. One or two latches could be used.

Figure 6:
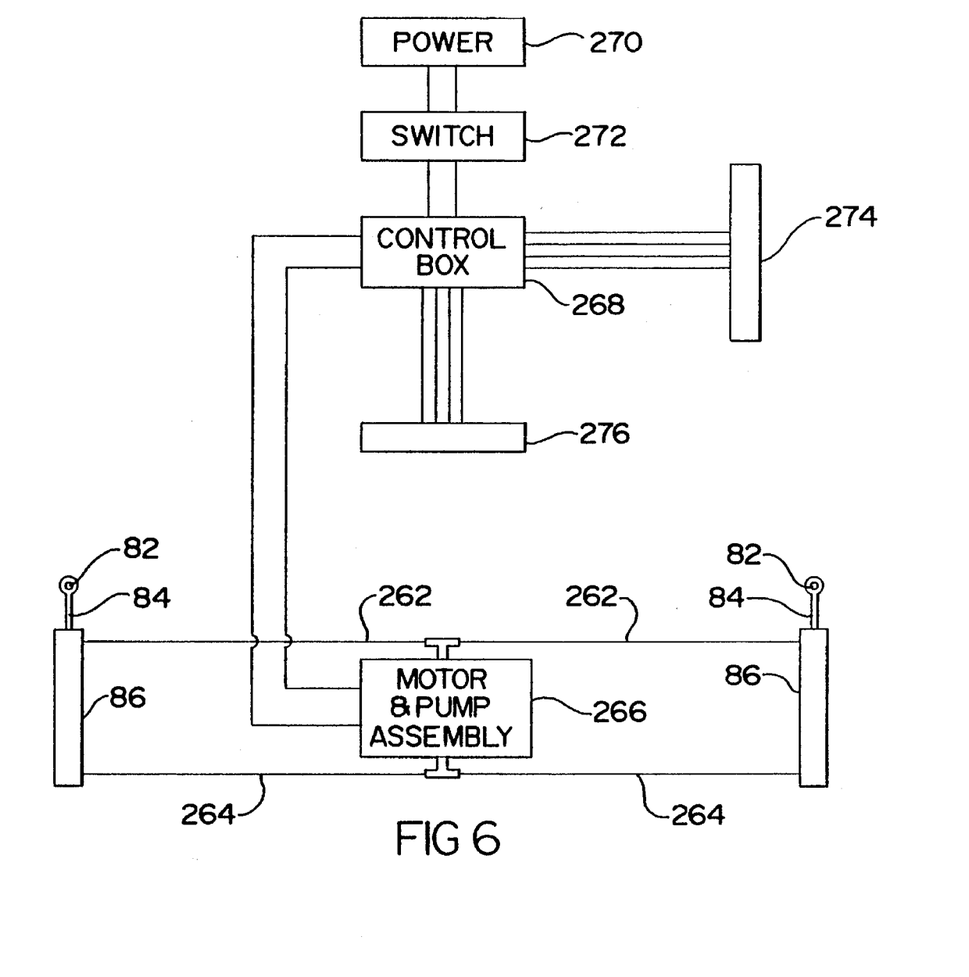
FIG. 6 is an electrical and hydraulic schematic of power cylinders and controls for operating the top, according to this invention.

FIG. 6 schematically illustrates the controls for raising and lowering convertible top 26. Hydraulic cylinders 86 are provided with hydraulic pressure fluid via lines 262, 264 by a motor and pump assembly 266. This motor and pump assembly may be of any conventional type, but is preferably the assembly fully disclosed in U.S. Pat. No. 5,279,119 to Shelhart et al., incorporated herein by reference.

Operation of pump and motor assembly is controlled by a electrical controller 268, which preferably contains electronic switching and logic circuitry suitable to control operation of the top as described below. Controller is provided with power by the vehicle electric power supply 270 that is preferably operated by a single two-position switch 272 of any conventional type. Controller 268 also controls operation of a header latch system 274 having header latches, such as disclosed in the aforementioned Sautter patent, and the tonneau latch system 276, which may be of the types described above in reference to FIGS. 12 and 13 or FIGS. 14–16.

Operation of top 26 from its raised FIG. 1 position to its lowered and stored FIG. 2 position will now be described in reference to FIGS. 3, and 6–11. In FIG. 3, top 26 is fully raised and extended, with header 34 latched to windshield W and tonneau 30 latched to the vehicle body as previously described. To lower top 26, switch 272 is operated to actuate controller 268, which will initially operate header latches 274 and tonneau latches 276 to unlatch.

When latches of latch systems 274 and 276 are unlatched, as sensed by conventional position switches (not illustrated), controller 268 will operate motor and pump assembly 266 to supply hydraulic pressure fluid to the cylinder ends of cylinders 86 to begin extending rods 84 through three phases of movement. During the initial phase, rear bow 42 is raised; during the intermediate phase, tonneau 30 is opened and rear rail 50 is rotated to lower top 26; and during the final phase, top 26 is fully lowered and tonneau 30 is closed.

During the initial phase, movement of each cylinder rod 84 will rotate drive link 80 about fixed pivot 58 until lower leg 80b engages lower flange portion 88b as shown in FIG. 7. This motion forces movable power pivot 82 downward, pulling rear bow inner ear 74 with it. The outer end of rear bow 42 disengages tonneau 30 and begins to rotate upwardly about its pivot 76 on rear rail 50. This moves inner ear 74 and forces links 96 and 98 to collapse upward under the influence of spring 105. Since #4 bow 40 is pivotally attached to rear bow 42, it is carried along with it to a position adjacent rear rail 50. Thus, the initial movement of cylinder rods 84 folds bows 40 and 42 to the FIG. 7 position, which provides clearance for opening tonneau 30.

Figure 8:
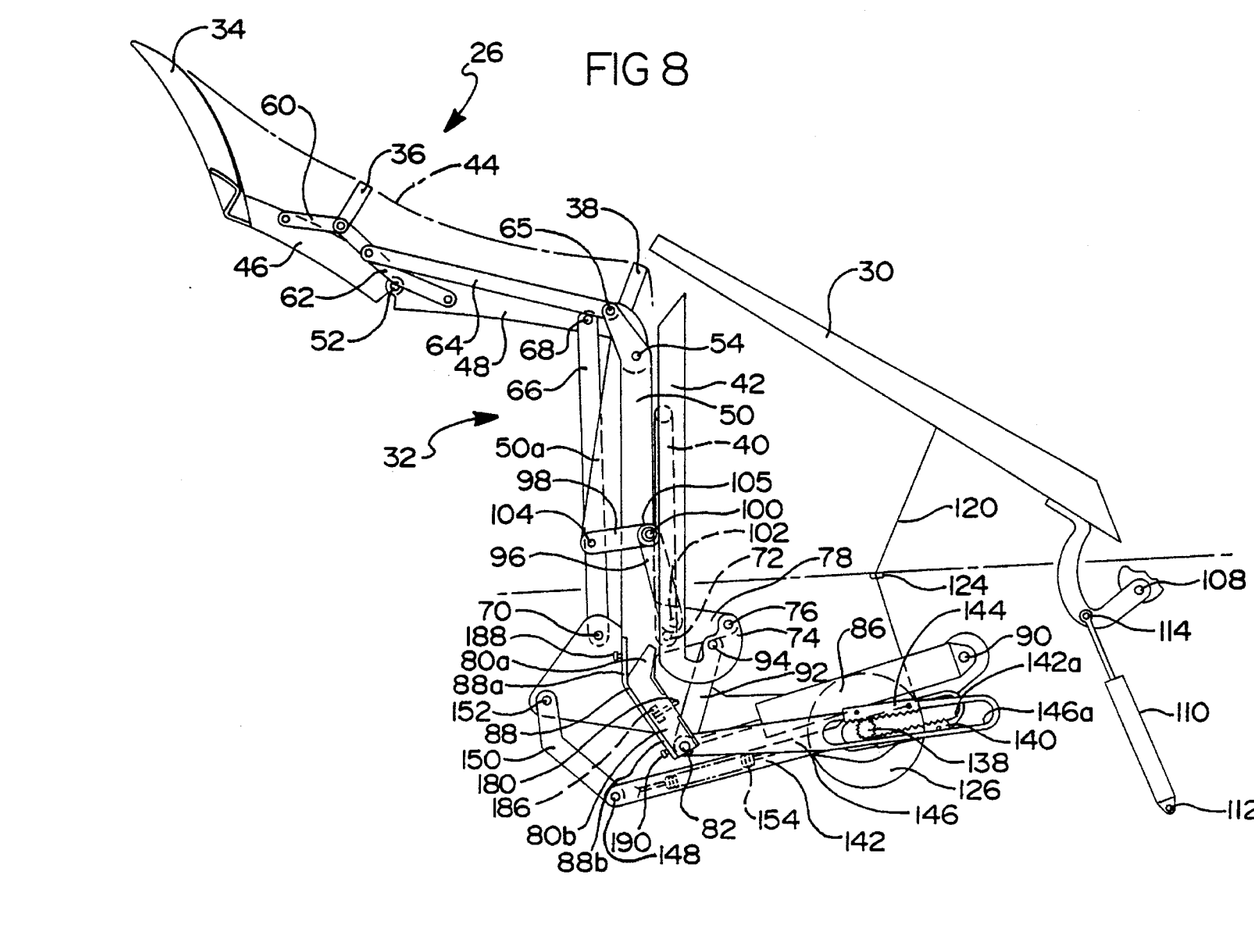
FIG. 8 is a view similar to FIG. 7, but showing the tonneau partially opened and the top beginning to fold.
Figure 17:
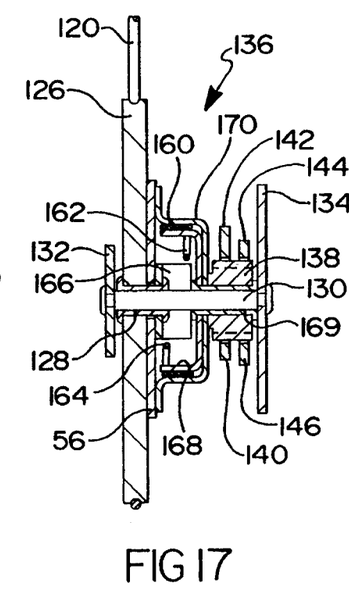
FIG. 17 is a sectional view taken along line 17—17 of FIG. 3, showing the tonneau operating mechanism.
Figure 18:
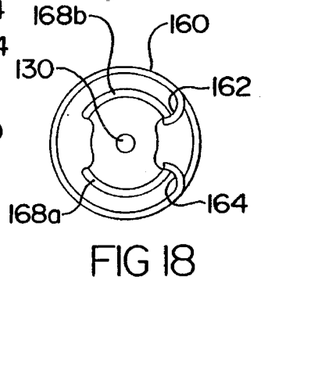
FIG. 18 is a detail view of one side of a clutch used in the mechanism of FIG. 17.
Figure 19:
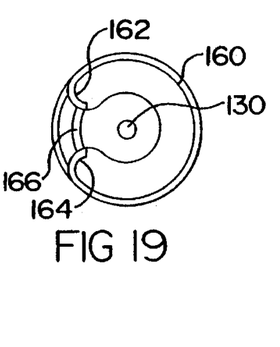
FIG. 19 is a detail view of the other side of the clutch of FIG. 18.

During the intermediate phase, continued extension of cylinder rods 84 will engage drive link lower leg 80b with rear rail lower flange 88b. This will begin rotating power pivot 82 and rear rail 50 clockwise about fixed pivot 58, as shown in FIG. 8. This movement of pivot 82 pulls upper drive member 146 leftward, engaging rack 144 with pinion 138. As shown in FIGS. 17–19, pinion 138 engages drive tab 168a with spring end 164, to contract torsion spring, and engages drive tab 166 to rotate reel 126 clockwise. This unreels cable 120 and allows tonneau 30 to begin opening under the force of gas springs 110, as shown in FIG. 8.

As tonneau 30 is opening, top 26 begins to fold. As drive link 80 drives rear rail 50 about pivot 58, latch 180 is carried along and disengages tab 186 and latches drive link lower leg 80b to rear rail lower flange 88b, as shown in FIG. 5. As rear rail 50 rotates about pivot 58, it pulls the end of center rail 48 which begins to rotate balance link 66 about its fixed pivot 70. This begins pulling center rail 48 downward toward rear rail 50. As center rail 48 moves downward, control link 64 pulls front rail 46 upward to begin folding back onto center rail 48.

Figure 9:
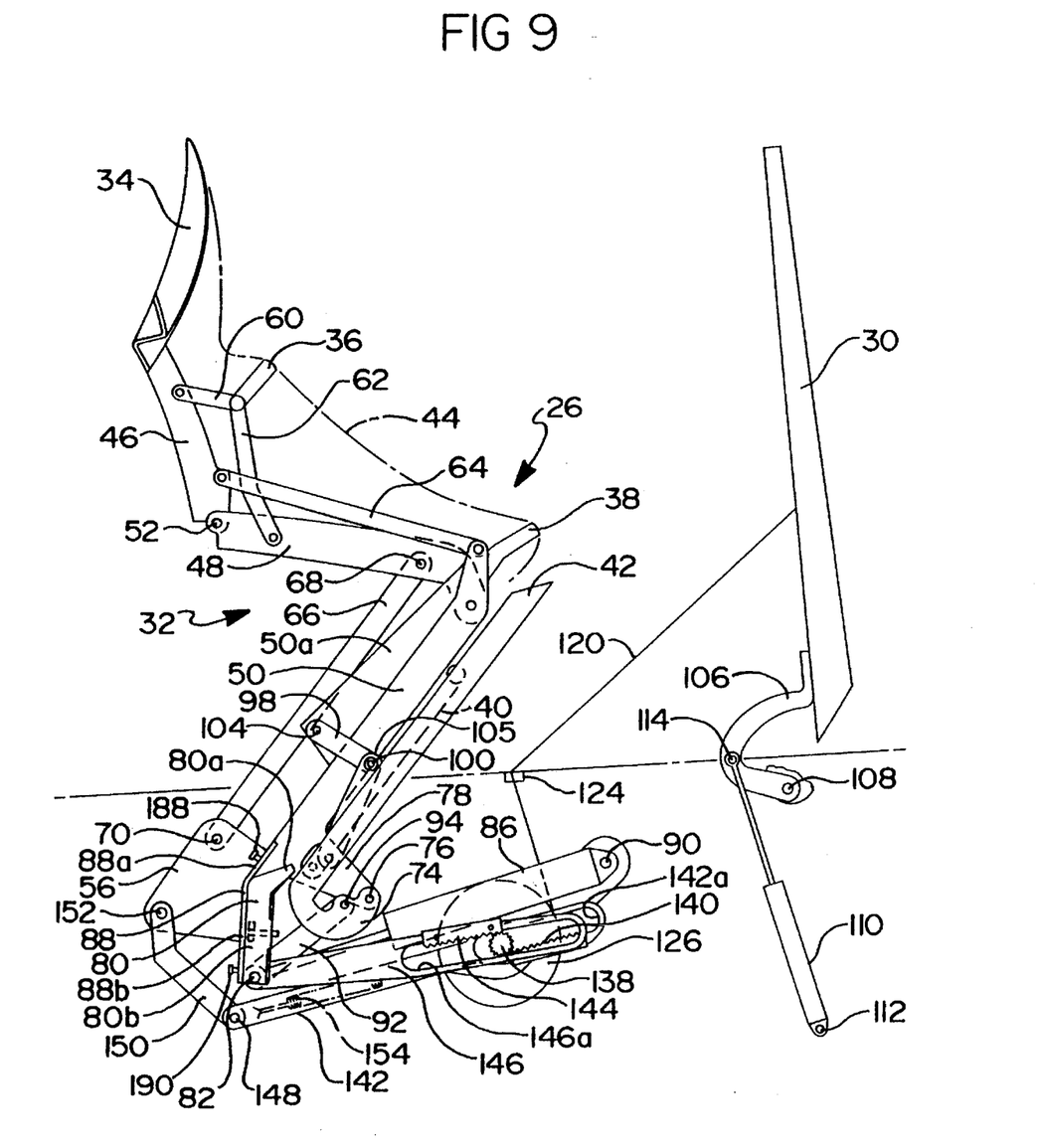
FIG. 9 is a view similar to FIG. 8, but showing the tonneau fully opened and the top partially folded.

Further extension of cylinder rod 84 causes upper drive member 146 to further rotate pinion 138 and reel 126 to enable tonneau 30 to open fully to the FIG. 9 position. Further rotation of rear rail 50 causes further folding of front rail 46 and center rail 48. Rear bow control link 92 assures that rear bow 42 and #4 bow 40 will fold with rear rail 50. At this point in operation, tonneau 30 is fully open and top 26 is partially folded.

Figure 10:
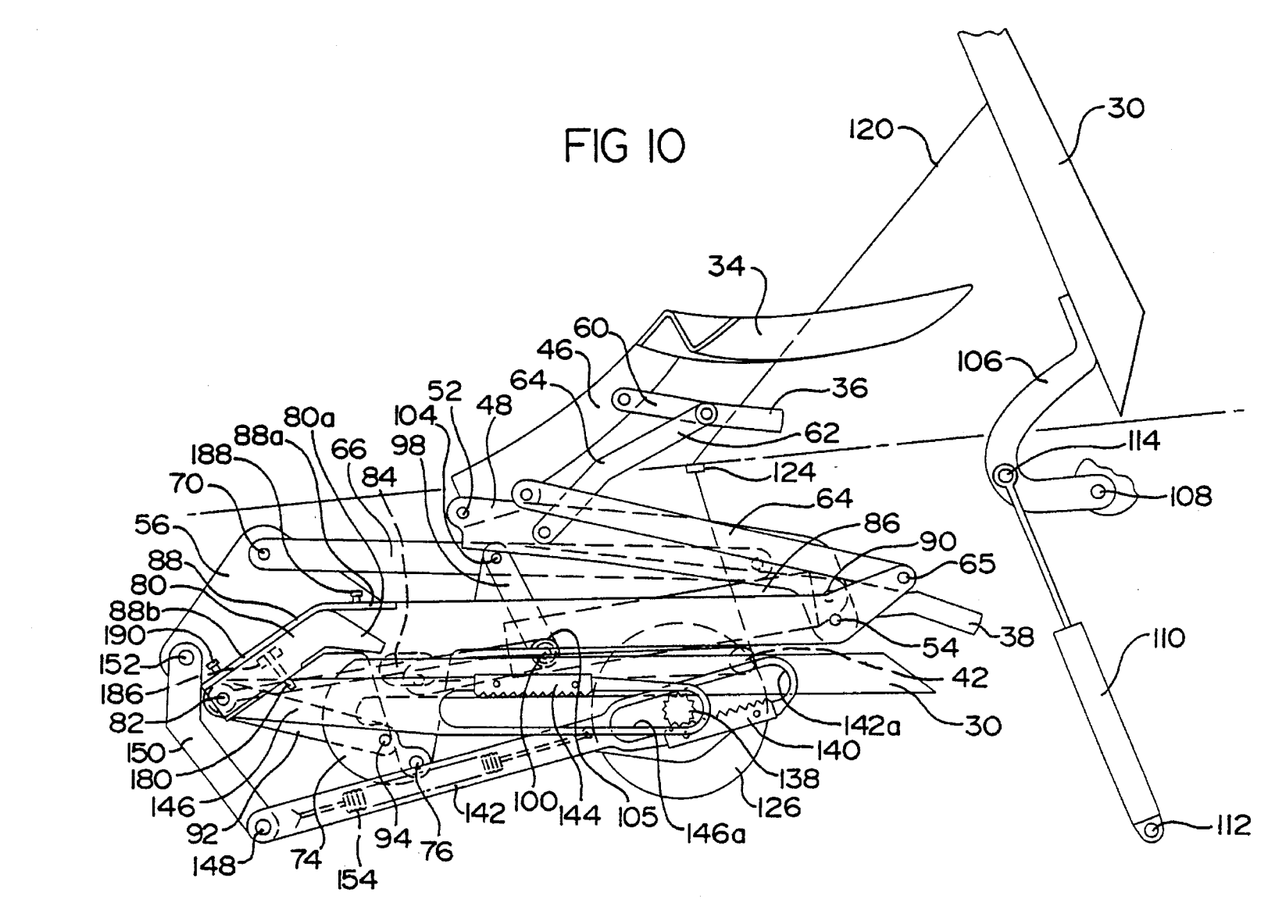
FIG. 10 is a view similar to FIG. 9, but with the top nearly fully folded and some parts omitted for clarity.

Tonneau 30 can be maintained open to allow further folding of top 26 from the FIG. 9 position to the FIG. 10 position. The dwell time or duration of maintaining tonneau 30 open depends on the geometry of the top and its folding motion, and the time needed to fold it sufficiently to prevent tonneau interference. This dwell time is determined by the positioning of rack 140 along slot 142a and is increased as rack 140 is positioned to the right as viewed in the drawings.

During the final phase, extension of cylinder rod 84 beyond the FIG. 9 position will disengage lower drive member rack 144 from pinion 138. Rotation of rear rail 50 causes the bottom end of drive flange lower portion 88b to engage drive member control link 150 and begin rotating it around pivot 152. This moves lower control member 142 leftward to engage rack 140 with pinion 138. This movement of lower drive member 142 begins stretching spring 154.

Figure 11:
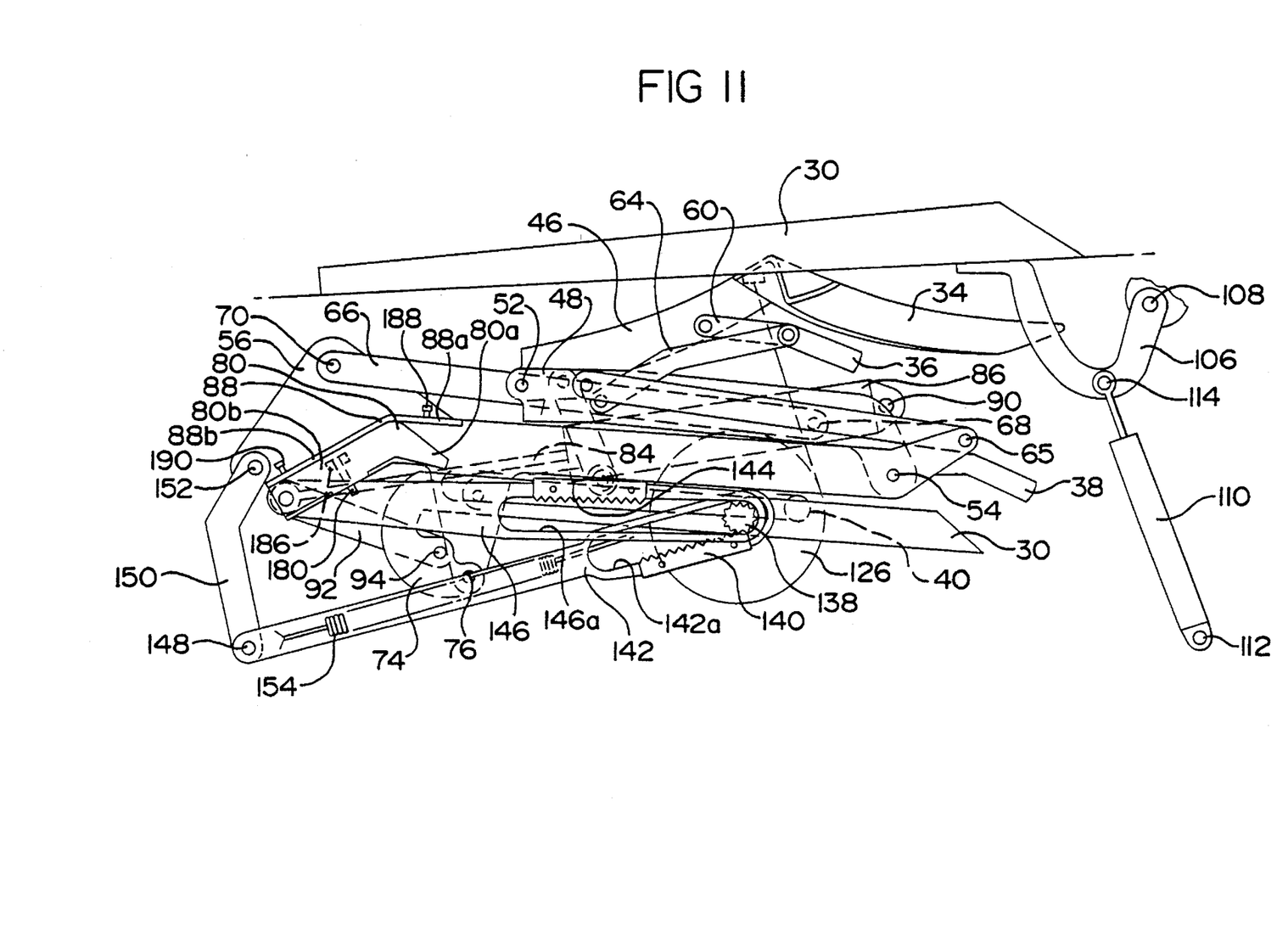
FIG. 11 is a view similar to FIG. 10, but with the top fully folded and the tonneau closed and with some parts omitted for clarity.

Rotation of pinion 138 forces pinion tab 168a to engage spring end 164, contracting spring 160, and engages reel tab 166 to rotate reel 126 to begin winding up cord 120 and closing tonneau 30 as top 26 continues to fold, as shown in FIG. 10. Cylinder rod end 84 will continue to extend and rotate rear rail 50 until top 26 is fully retracted and folded, as shown in FIG. 11. Rear rail lower flange portion 88b will continue to rotate control link 150 and drag lower control member 142 leftward, further rotating pinion 138 and reel 126 until tonneau 30 is fully closed as pinion 30 disengages rack 140 and reaches the end of slot 142a. Completion of top folding and tonneau closing occur simultaneously. These events are sensed by conventional position switches (not shown) which causes controller 268 to stop motor and pump assembly 266.

Tonneau 30 will be latched automatically when hooks 200 engage hook receiver abutments 208 upon closure of tonneau 30, as described above with reference to FIGS. 12 and 13 and FIGS. 14–16. Lowering of top 26 has been accomplished simply, by operating a single switch, and quickly, by concurrently operating the top and tonneau and inexpensively, by the use of only two hydraulic cylinders. If desired, controller 268 can also control operation of power side windows in synchronization with top operation, in a known manner.

Raising of top 26 is accomplished in a reverse of the sequence of operation just described. Operation of switch 272 will unlatch the latches of tonneau latch system 276 and actuate motor and pump assembly 266 to supply hydraulic pressure fluid to the rod ends of cylinders 86 through lines 262 to begin retracting rods 84, which again move through three phrases of movement. During the initial phase, tonneau 30 is opened and rear rail 50 is rotated to begin raising top 26. During the intermediate phase, top 26 is fully raised and tonneau 30 is closed; and during the final phase, rear bow 42 is lowered onto tonneau 30.

In the initial phase, each rod 84 begins reverse rotation of drive link 80 and rear rail 50 since these elements are latched together by latch 180. Spring 154 keeps link 150 engaged with rear rail lower flange portion 88b to move with it. This forces rack 140 to engage and rotate pinion 138 and reel 126 to unreel cord 120 to begin opening tonneau 30 by gas spring 110. Thus, top 26 begins raising as tonneau 30 begins opening. Further retraction of output rods 84 continues rotating rear rail 50 to continue raising top 26. Rear bow 42 and #4 bow 40 will raise with rear rail 50 so long as latch 180 remains latched.

As an alternative, a latch similar to latch member 180 could be used to latch rear rail lower flange 88b to link 150 for movement with it. This could be in addition to, or as a replacement for spring 154. A release tab, similar to tab 186, would be mounted on body bracket 56 to disengage the latch between the FIGS. 9 and 10 positions, when rack 140 disengages pinion 138 when tonneau 30 is fully raised.

The intermediate phase of top raising begins when continued retraction of output rods 84 causes pinion 138 to disengage rack 140. Tonneau 30 can be maintained open to allow further raising of top 26 from the FIG. 9 position toward the FIG. 8 position. The dwell time or duration of maintaining tonneau 30 open depends on the geometry of the top and its unfolding motion, and the time needed to unfold it sufficiently to prevent tonneau interference. This dwell time is determined by the positioning of rack 144 along slot 146a and is increased as rack 144 is positioned to the left as viewed in the drawings.

At the appropriate time, rack 144 will reengage pinion 38 (FIG. 9). Further motion of rack 144 rotates pinion 138 to begin winding flexible cable 120 on reel 126 to begin closing tonneau 30 as top 26 is fully raised and extended (see FIG. 8).

Figure 4:
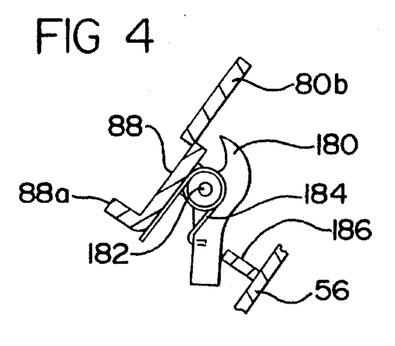
FIG. 4 is an enlarged sectional view taken along line 4—4 of FIG. 3, showing a latch for latching the power link to the rear bow, shown unlatched.

FIG. 7 illustrates initiation of the final phase position in which further retraction of output rods 84 causes pinion 138 to disengage rack 144. This allows torsion spring 160 (FIGS. 17–19) to secure reel 126 and hold tonneau 30 closed. Also, final rotation of rear rail 50 engages latch 180 with tab 186 to free drive link lower leg 80b from rear rail lower flange 88b, (see FIG. 4). Further retraction of output rods 84 causes power link lower 80 to raise control link 92 to lower rear bow 42 onto tonneau 30 where it may be latched.

As output rods 84 finally retract, drive link upper leg 80a engages rear rail upper flange portion 88b to force rear rail 50 to fully extend top 26 to the FIG. 3 position. This extension assures engagement of header 34 with windshield W to facilitate latching. When the FIG. 3 position is sensed by conventional position switches (not shown), controller 268 will stop pump and motor assembly 266 and operate the latches of latch systems 274 and 276 to latch header 34 to windshield W and latch tonneau 30 and rear bow 42.

While only preferred embodiments have been illustrated and described, obvious modifications thereof are contemplated within the scope of this invention and the following claims.

While it is desirable that the mechanisms for operating the top and rear bow be duplicated and the mechanism for operating the tonneau be provided on one side only, all or none could be duplicated, depending on the force and control requirements of any particular installation. Electric motors could be used in place of the hydraulic cylinders. An intermittent drive could be used in place of the dual rack, pinion, clutch and reel apparatus described. In addition, the #4 bow could be pivoted to the rear rail instead of to the rear bow.

I claim:

1. A convertible vehicle having a foldable top movable between an extended raised position and folded lowered position in a storage well; a tonneau movable between positions opening and closing the storage well; wherein the top comprises spaced articulated side rail structures that are interconnected by spaced transverse bows, including a movable rear bow engageable with the closed tonneau in top raised position; power means; and first linkage means connecting the power means to the side rail structures to enable the power means to raise and lower the top, characterized by second linkage means connecting the power means to the tonneau to enable the power means to open the tonneau to permit top movement between raised and lowered positions and to close the tonneau in top raised and lowered positions, and third linkage means connecting the power means with the rear bow to enable the power means to raise the rear bow during top raising to provide clearance for movement of the tonneau between open and closed positions, thereby enabling the power means to raise the rear bow, open the tonneau and begin lowering the top, and close the tonneau as the top is fully lowered to lower the top, and to open the tonneau and begin raising the top, close the tonneau as the top is fully raised, and lower the rear bow onto the tonneau to raise the top.

2. The convertible vehicle of claim 1, wherein the second linkage means include biasing means biasing the tonneau open and operating means connecting the tonneau with the power means for overcoming the biasing means to close the tonneau.

3. The convertible vehicle of claim 2, wherein the operating means include an intermittent drive which delays tonneau movement until after the rear bow is raised, enables the tonneau to remain open during movement of the top between raised and lowered positions, and causes the tonneau to close as the top reaches either raised or lowered position.

4. The convertible vehicle of claim 3, wherein each articulated side rail structure includes a rear rail pivotally mounted on the vehicle at a first pivot, the power means include a hydraulic cylinder having an output rod that is extensible to lower the top and retractable to raise the top, the first linkage means comprises a power link pivotally mounted on the vehicle at the first pivot and pivoted to the output rod at a power pivot, the rear bow is pivoted to the rear rail at a second pivot, and the third linkage means include a control link mounted on the power pivot and pivoted to the rear bow at a third pivot, and the rear rail includes an abutment drivingly engageable by the power link after extension of the output rod, whereby initial extension of the output rod causes the control link to raise the rear bow before the power link engages the abutment, and further extension of the output rod causes the power link to pivot the rear rail to lower the top.

5. The convertible vehicle of claim 4, wherein the intermittent drive includes a rotatable reel mounted on the body, a flexible cord wound on the reel and having an end connected to the tonneau, a first reel drive link that is operatively connected to the power link for rotating the reel to unwind the flexible cord and enable the biasing means to open the tonneau after initial movement of the output rod during top lowering, and is operatively connected to the power link for rotating the reel to wind the flexible cord and close the tonneau after the top is raised but before the rear rail is lowered during top raising, a second reel drive link that is operatively engaged by the power link during the final movement of the power link to rotate the reel to wind the flexible cord and close the tonneau after the top is lowered, and spring means for operating the second reel drive link to rotate the reel during initial movement of the power link to unwind the flexible cord and open the tonneau during top raising.

6. The convertible vehicle of claim 5, wherein the intermittent drive includes a pinion mounted on the reel, a rack carried by the first reel drive link for engaging the pinion to rotate the reel and a second rack carried by the second reel drive link for engaging the pinion to rotate the reel.

7. The convertible vehicle of claim 6, wherein the first reel drive link is pivoted to the power link at the power pivot, and the second reel drive link is pivoted to the vehicle by a reel drive control link that is engageable by the rear rail during its final rotation by the power link to rotate the reel to wind the flexible cord and close the tonneau after the top is lowered.

8. The convertible vehicle of claim 6, wherein the first and second racks are adjustable along the first and second drive links to selectively vary the dwell in the operation of the tonneau by the hydraulic cylinders to vary the duration that the tonneau remains fully open during raising and lowering of the top.

9. The convertible vehicle of claim 6, including a clutch connecting the reel and pinion for enabling the reel to be rotated in either direction by the pinion, and preventing reel rotation when not driven by the pinion.

10. The convertible vehicle of claim 4, wherein another transverse bow is pivoted to the rear bow for movement therewith as the rear bow is raised and lowered to enable raising and lowering of the top.

11. The convertible vehicle of claim 4, wherein the rear rail includes a latch for latching the power link to the abutment after movement of the rear bow from the top raised position, and further including an unlatching member on the vehicle for disabling the latch to release the power link when the rear rail is in the top raised position.

12. The convertible vehicle of claim 9, wherein the rear rail includes a second abutment engageable by the power link when the output rod is fully retracted to cause the rear rail to fully extend the top.

13. The convertible vehicle of claim 10, further including adjustment means for selectively varying the rotational positions at which the power link engages the abutments.

14. A convertible vehicle having a foldable top movable between an extended raised position and folded lowered position in a storage well; a tonneau movable between positions opening and closing the storage well; tonneau latches for latching the tonneau to the vehicle; wherein the top comprises spaced articulated side rail structures, each having a rear rail, the side rail structures being interconnected by a header for attachment to the vehicle windshield and by spaced transverse bows, including a movable rear bow engageable with the closed tonneau in top raised position; header latches for latching the header to the windshield, a pair of spaced hydraulic cylinders each having an output rod, and a power link connecting each output rod to a side rail structure to enable the cylinders to raise and lower the top, characterized by biasing means biasing the tonneau open, an intermittent drive connecting the tonneau with the power means for overcoming the biasing means to close the tonneau upon operation of the power means, a control link connecting each output rod with the rear bow to enable the cylinders to raise the rear bow during top raising to provide clearance for movement of the tonneau between open and closed positions, and a controller for operating the latches and cylinders to open the header and tonneau latches, raise the rear bow, open the tonneau and begin lowering the top, and close the tonneau while fully lowering the top, and closing the tonneau latches to lower the top, and to open the tonneau latch, open the tonneau and begin raising the top, close the tonneau while fully raising the top, lowering the rear bow onto the tonneau, and closing the header and tonneau latches to raise the top.

15. The convertible vehicle of claim 14, wherein the intermittent drive includes means for providing a varying dwell in the operation of the tonneau by the hydraulic cylinders to vary the duration that the tonneau remains fully open during raising and lowering of the top.

16. The convertible vehicle of claim 15, wherein the tonneau latches each comprise a tonneau-mounted hook, a receiver rotatably mounted on the body, an overcenter spring operable to rotate the receiver to capture the hook upon engagement thereof by the hook, and a power release operated by the controller to reversely rotate the receiver to release the hook.

17. The convertible vehicle of claim 16, wherein the power release comprises a solenoid.

18. The convertible vehicle of claim 16, wherein two of said latches are provided, and the power release comprises a centrally-mounted power unit and flexible cables connecting the power unit to the receivers.

19. The convertible vehicle of claim 18, wherein the power unit comprises a cable reel for winding the cables, a gear mounting the cable reel for rotation, an electric motor having a slidable output shaft mounting a worm, a spring biasing the output shaft to disengage the worm from the gear, and a mechanism responsive to operation of the motor to slide the output shaft to engage the worm with the gear to enable the motor to rotate the reel.

* * * * *